July 26, 1932.                A. B. HURLEY                1,868,834
                       NONGLARE MOVING PICTURE SCREEN
                        Original Filed Feb. 21, 1929

Inventor
Albert B. Hurley
By Edward E. Clement
Attorney

Patented July 26, 1932

1,868,834

UNITED STATES PATENT OFFICE

ALBERT B. HURLEY, OF NEW YORK, N. Y.

NONGLARE MOVING PICTURE SCREEN

Original application filed February 21, 1929, Serial No. 341,758. Divided and this application filed July 26, 1929. Serial No. 381,261.

My invention relates to apparatus for the regulation and composition of light with respect to the eye of an observer, so as to produce normal light effects thereon, which may be referred to as artificial daylight effects. The invention is based upon certain discoveries which I have made and which will be fully described hereinafter, and is closely related to the inventions described and claimed in Letters Patent heretofore granted to me as follows: No. 1,659,734, granted February 21, 1928; No. 1,659,952, granted February 21, 1928; and No. 1,715,759, granted June 4, 1929.

My present application is a division of my prior copending application, Serial No. 341,758, filed February 21, 1929; and the present invention has for its object to produce an improved screen for moving picture projection, so constructed as to regulate the amount, intensity and quality of light transmitted to the eyes of the observers. While the operation involved herein and the principle upon which it is based, apply as well to transmitted light as they do to reflected light, I shall specifically describe herein the application of said principle to reflected light giving sufficient directions to enable the invention to be practiced with transmitted light.

In my prior patents I have disclosed a method of modifying the light reflected from a surface, by applying thereto a filter in such manner as to suppress a part of the light rays which would normally be reflected from the surface, and uniformly mingling the remaining rays, which for simplicity may be referred to as tinted rays, with a certain proportion of white light or the light that is normally reflected from the surface which also is uniformly distributed and remains unmodified. I have shown that not only the composition of the light reflected from the filter surfaces, but also the percentage of light unmodified and the percentage of tinted rays reflected from the filter surfaces, are important. In these disclosures, a limited focal distance of the reflecting surface from the eye is assumed as for example, fourteen (14) inches more or less, using a fine mesh for the filter, which is suitable to the visual angle for that distance as for example 85 to 100 mesh per inch. In the present case I carry this farther but apply the same principle of a fixed visual angle, with respect to surfaces or transmitting media at varying distances from the eye. This depends upon my discovery that light transmitted for example from a moving picture screen can be subdivided, regulated, and composed, so as to produce the same balanced effect as the eighty-five to one hundred mesh, by suitably proportioning the filtering areas and the normal or unmodified areas so that each will subtend a visual angle of approximately forty-five seconds to two minutes. Thus my broad invention is made applicable to the transmission or reflection of light from any desired media, at any desired distance.

In addition to thus regulating the amount and intensity of the light, my invention has a second most important function, in regulating the quality or character of the light, commonly referred to as the color.

Though we cannot duplicate actual sunlight, especially as to the quantity of energy it diffuses, we can, by regulating the quality of artificially produced light, simulate the quality of sunlight and especially can correct the distorted percentages of light waves in different parts of the spectrum. This regulation is attained by suitably proportioning and tinting the light filter we employ. I shall hereinafter specifically describe the best means at present known to me for attaining this object.

My invention is illustrated in the accompanying drawing, in which

Figure 1:
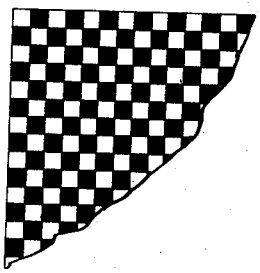
Fig. 1 represents a fragment on an enlarged scale of a surface treated by one application of this method.

Fig. 1 represents an enlarged fragment of a surface treated by one particular application of this method. The dimensions of each of the pigment squares, spots or figures are within certain defined limits of size, according to the reflection factor and other characteristics of the surface to be treated, and the number of these to a unit of surface determines the amount of the background surface exposed which may reflect the full hue and value of the incident light. By regulating the pigment mixture and the relative sizes of the pigment figure and the exposed surface in a unit of surface, we can regulate the amount and quality of the light reflected, and the stimulation of the eye can be increased or reduced to any desired degree, while giving perception of white light.

Figure 4:
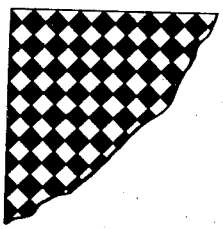
Fig. 4 is a fragmentary view similar to Fig. 1 showing a portion of a moving picture screen having its area divided into four sided figures with their points vertical and horizontal.

It is to be noted that the squares, spots or diamonds which are black in Figs. 1 and 4 really represent the color filter, which consists of a plurality of such squares, points or diamonds coated with pigment suitable to my purpose in any particular case. The mixture of pigments is complex and it is not always possible to exactly duplicate the spectral character we seek, but we can obtain satisfactory results if we sacrifice the transmission of some long waves and the absorption of some short waves.

We can relieve to a great extent the eye strain and fatigue induced by moving pictures by an application of the idea disclosed herein. In treating a projection screen, however, we have two separate and distinct light sources of different spectral character to consider which makes it necessary to employ a different pigment mixture in each case, but the pigment figures will be the same size.

Figure 2:
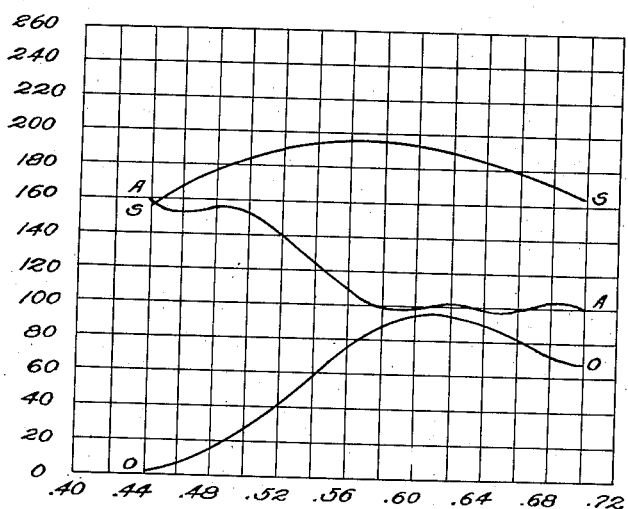
Fig. 2 is a diagram representing the spectral energy distribution of the high intensity arc used in moving picture projection, and a pigment of such a spectral character as to be used on the projection screen to produce normal light.

In Fig. 2 curves A and S represent the spectral energy distribution of the high intensity arc and sunlight respectively, and the curves are plotted with their energy values at a point near the limit of visibility or $0.44\mu$. By subtracting the ordinates of A from the ordinates of S, curve O is obtained, which means that if the proper amount of light of the spectral character of O was added to the light produced by A, a light of the spectral character of S (sunlight) would be produced. A pigment of the spectral character of curve O, or one of an orange hue would thus be used upon a white projection screen surface, if the incident light was the high intensity arc.

Figure 3:
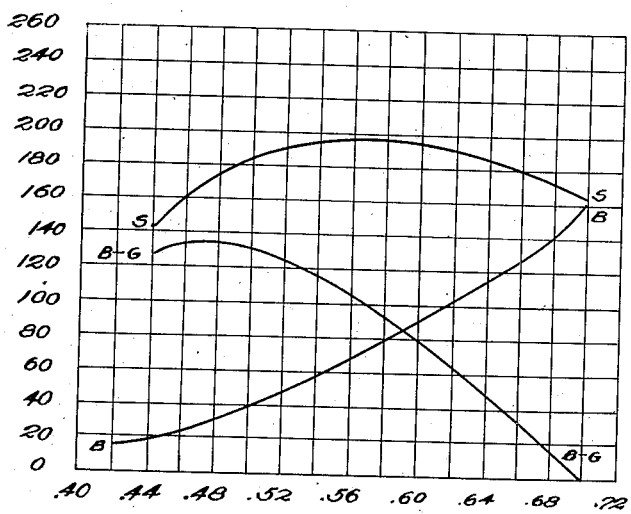
Fig. 3 is a diagram representing the spectral energy distribution of the improved Mazda C lamp.

In Fig. 3 curve B represents the spectral energy distribution of the improved Mazda C lamp used in moving picture projection. The energy value of curve B at $0.70\mu$ is plotted to equal that of S (sunlight) at that wave length. As aforesaid, the ordinates of B are subtracted from S to obtain B—G which is complementary to B and means that a pigment of that spectral character would be used on projection screen if incident light was the Mazda C lamp.

We have assumed that the projection screen surface would reflect the full hue and value of the incident light from the two sources mentioned and the curve for this surface would be a line parallel to the base line of Figs. 2 and 3. If in commercial use it is found necessary to use a surface background for the screen which does not, within limits of white, reflect the full hue and value of the incident light, the color characteristics of such surface can be corrected, and the idea maintained, by plotting the curve of its energy distribution in either Fig. 2 or 3 and adding ordinates of such curve to A and O or B—G and B respectively.

A moving picture screen may be viewed at distances varying from 20 feet to 150 feet and in a few of the larger theaters the patron may be at greater distance from the screen. The size of the pigment figure should then be calculated from the shortest distance at which the screen is viewed. The pigment should be deposited in uniform squares in mosaic or checkered fashion. Each unit (comprising one pigment figure absorbing part and reflecting part of the incident light, and the related white surface exposed and reflecting fully the incident rays) should not be visible nor readily resolved by the eyes of patrons occupying the nearest seats. The uniformly arranged pigment squares and the dimensions of spacing would then subtend to the eye at a distance of twenty feet a visual angle of about 45 seconds to 2 minutes according to brightness of illumination, the reflection factor of the screen and the hue and value of the pigment used.

In Fig. 4, I have shown a fragment of a color filter or screen somewhat similar to that shown in Fig. 1 but with the points of the figures turned vertically and horizontally, so as to form a checkerboard of figures standing on their points. The purpose of this is to provide a greater lateral transmission of light rays from the screen, so as to measurably care for the fading or dimness which occurs when the observer moves around toward the side or edge of the screen. Particularly is this noticable to the eye of an observer located to one side of the center of the screen, the white light passing at an oblique angle being apparently increased in amount. This effect can be accentuated by embossing the surface of the screen fabric so as to project either the shaded areas or the unshaded areas. It will be understood that moving picture screens and similar surfaces whatever their dimensions or intended distance from the eye of an observer, may be processed by the same machine heretofore described, or by any other suitable means. Where the fabric is heavy and the surface especially prepared for a definite rate of diffusion, it may be desirable to apply my process by means similar to decalcamania transfers. Thus, instead of processing the screen surface itself, the color filter or grid intended to be applied thereto may first be processed upon a transparent sheet or film and the latter may then be applied to the screen surfaces. Such a transparent film might remain intact on the surface, or by the decalcamania effect may be removed therefrom, leaving only the filter or screen applied to the surface.

What I claim is:

1. A projection screen having a reflecting surface, and a color filter applied thereto consisting of pigment deposited thereon in circumscribed figures, uniformly distributed, leaving uniformly distributed parts of the surface exposed to reflect incident light unchanged, each unit comprising one pigment figure absorbing part and reflecting part of the incident light, and the related normal surface exposed and reflecting fully the incident rays, being of such dimensions as to subtend to the eye of an observer at a distance of approximately twenty feet a visual angle of about 45 seconds to 2 minutes.

2. The screen described in claim 1, in which the pigment spots and the enclosed exposed surface spots are four sided, with points up.

3. The screen described in claim 1, having its surface embossed in figures.

In testimony whereof I hereunto affix my signature.

ALBERT B. HURLEY.